Sept. 11, 1962 V. W. KREMER ET AL 3,053,881
PROCESS FOR THE PRODUCTION OF ACRYLONITRILE FROM ACETYLENE AND HYDROGEN CYANIDE
Filed Nov. 12, 1958
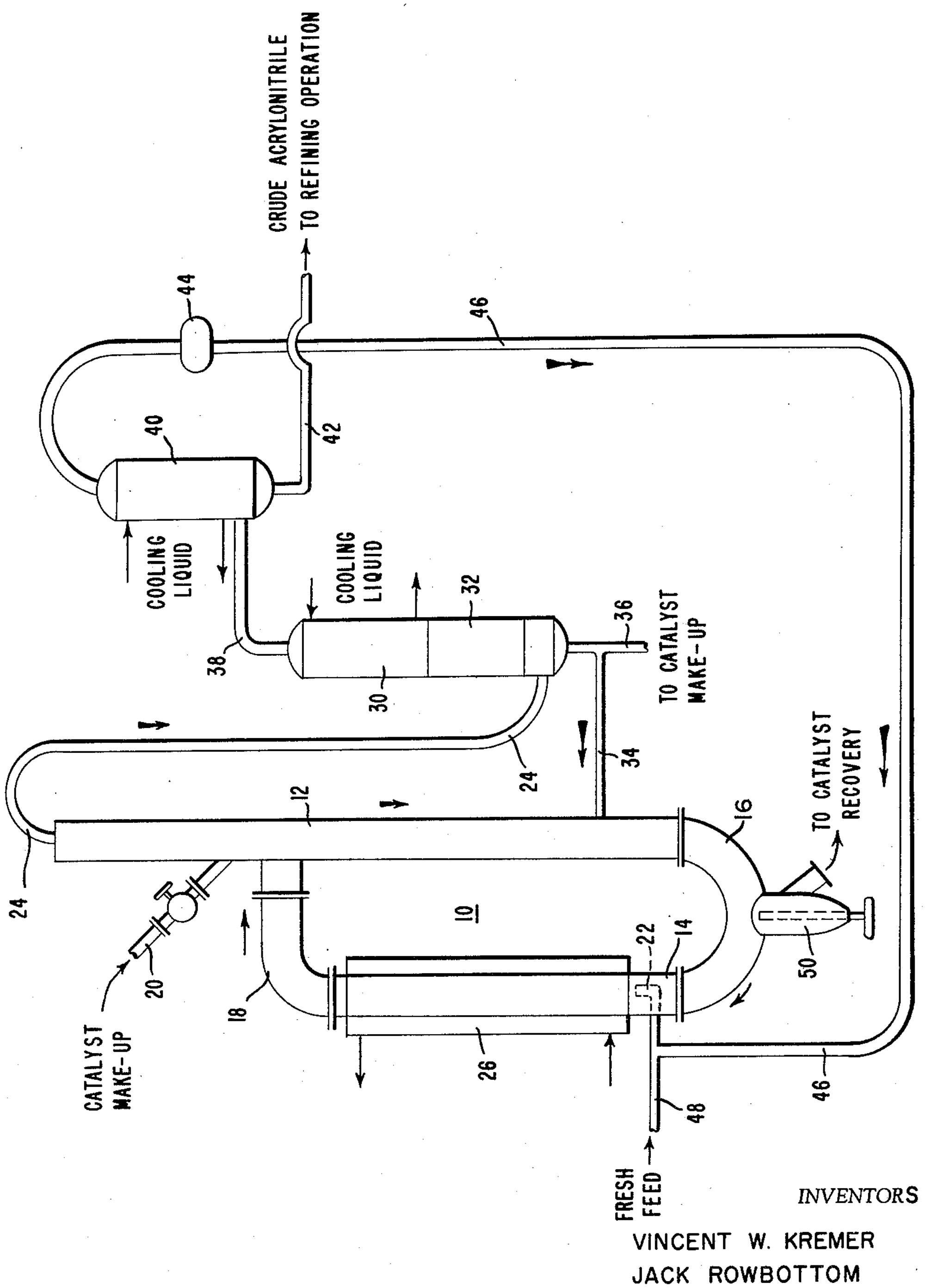
INVENTORS
VINCENT W. KREMER
JACK ROWBOTTOM
BY Norris E. Ruckman
ATTORNEY

United States Patent Office 3,053,881
Patented Sept. 11, 1962

1

3,053,881
PROCESS FOR THE PRODUCTION OF ACRYLONITRILE FROM ACETYLENE AND HYDROGEN CYANIDE

Vincent Willard Kremer and Jack Rowbottom, Niagara Falls, N.Y., assignors to E. I. du Pont de Nemours and Company, Wilmington, Del., a corporation of Delaware Filed Nov. 12, 1958, Ser. No. 773,292
7 Claims. (Cl. 260—465.3)

This invention relates to liquid phase production of acrylonitrile from acetylene and hydrogen cyanide, and is concerned more particularly with an improved process for reacting acetylene with hydrogen cyanide in the presence of catalyst dissolved in anhydrous liquid solvent to produce acrylonitrile in a continuous operation.

Acrylonitrile has commonly been prepared from acetylene and hydrogen cyanide by reaction in the presence of an aqueous solution of cuprous chloride catalyst at temperatures of about 70°–100° C. The overall reaction is $$HC{\equiv}CH+HCN \rightarrow H_2C{=}CH{-}CN$$

Other catalysts can be used but none has been found which is as effective as cuprous chloride. Any catalyst converted to cuprous cyanide in the presence of hydrogen cyanide becomes inactive. This can be avoided by maintaining sufficient hydrogen chloride in the catalyst solution to offset the effect of unreacted hydrogen cyanide in solution. The acetylene is much less soluble in the solution than the hydrogen cyanide. In order to get equivalent amounts into solution, the partial pressure of the acetylene must be several times that of the hydrogen cyanide vapor in contact with the catalyst solution. For a continuous process this involves supplying a corresponding excess of acetylene in the feed gas and recovering the excess from the reaction off-gas for reuse.

The reaction conditions required for acrylonitrile production also result in the formation of a variety of volatile by-products. The acetylene combines with water, hydrogen cyanide and hydrogen chloride to form acetaldehyde, lactonitrile (from acetaldehyde and HCN) and vinyl chloride, and dimerizes to form monovinylacetylene. The latter reacts further to form cyanobutadiene, chloroprene and the trimers, divinylacetylene and the $$H_2C{=}CH{-}CH{=}CH{-}C{\equiv}CH$$

isomer, which are especially difficult to separate from acrylonitrile. Non-volatile reaction products are also formed which may comprise polymers of mixtures of the above compounds. These are insoluble in water and separate from the catalyst solution as a tar.

The reaction off-gas contains, in addition to acrylonitrile and the above undesired volatile by-products, any unreacted hydrogen cyanide and a large excess of acetylene. It has been believed necessary to remove the acrylonitrile and by-products from the acetylene before recycling the acetylene to the reactor. The acrylonitrile and other water-soluble reaction products have been removed by scrubbing with water. The resulting aqueous solution was then subjected to fractional distillation to separate the acrylonitrile. Separation of the by-products from acrylonitrile is difficult, and more than a few parts per million has been found to be objectionable when the acrylonitrile is to be used for such purposes as acrylic fibers. Hence, by-product formation is a serious problem for this reason in addition to the undesirable lowering of acrylonitrile yield.

The desired reaction of acetylene with hydrogen cyanide cannot be favored by maintaining a large excess of hydrogen cyanide in the catalyst solution, because this causes the catalyst to become inactive. Instead, efforts have been made to attain more favorable equilibrium conditions for the desired reaction by maintaining as low a concentration of acrylonitrile at the catalyst as possible, using the flow of acetylene to sweep products away. Further reactions of by-products, such as monovinylacetylene, have been minimized by removing them from the catalyst solution quickly and by avoiding as far as possible their reintroduction with recycled acetylene.

2

The formation of acetaldehyde and lactonitrile can be avoided by going to an anhydrous system. Although cuprous chloride is soluble in a wide variety of solvents, it is important in a process based on the use of a non-aqueous solvent to keep solvent losses to a minimum and to avoid difficulties in solvent recovery. Evaporation of solvent from the catalyst solution can be reduced by use of solvents boiling substantially above the reaction temperature, and the relatively high boiling point in comparison with the volatile reaction products facilitates recovery. However, evaporation of water from aqueous catalyst solutions has served an important function in helping to remove heat of reaction. The heat of reaction of gaseous acetylene and hydrogen cyanide to produce gaseous acrylonitrile is about 41,400 calories per gram mole. Means must be provided for removing all this heat in a controllable manner, as high temperatures cause excessive tar formation and damage the catalyst. When using an anhydrous catalyst, recovery of acrylonitrile from the reactor off-gas by scrubbing with water to remove reaction products, as described previously, would require an expensive drying operation before the acetylene could be recycled. The alternative of removing substantially all of the reaction products by low temperature refrigeration would also be expensive.

It is an object of this invention to provide an improved process for producing acrylonitrile from acetylene and hydrogen cyanide in a substantially anhydrous system. Another object is to provide a continuous process for producing acrylonitrile, by reaction of acetylene and hydrogen cyanide in the presence of a catalyst dissolved in nonaqueous liquid, in which evaporated liquid and unreacted acetylene are recovered from reaction off-gas and recycled to the catalyst in an economical manner. A further object is to provide such a process in which considerable heat of reaction is removed by recycling liquid. A still further object is to provide novel apparatus for the process. Other objects will become apparent from the specification, the drawing and the claims.

In accordance with this invention it has been found that acrylonitrile can be produced in a highly efficient manner by continuously feeding hydrogen cyanide and excess acetylene into a substantially anhydrous homogeneous liquid catalyst containing cuprous chloride in organic solvent boiling above 100° C., maintaining the liquid catalyst at temperatures above 70° C. and below the boiling point of the solvent, continuously conducting off-gas containing acrylonitrile, volatile by-products, acetylene and vaporized solvent away from the liquid catalyst, separating at least 30° of the acrylonitrile and part of the by-products from the off-gas constituents as a crude acrylonitrile product, and recycling at least 10% of the acrylonitrile content of the off gas to the liquid catalyst, preferably in part as liquid with recovered solvent and in part as vapor with recycled acetylene and by-products to the feed. The crude acrylonitrile can then be refined in conventional manner to recover acrylonitrile of the desired purity. Non-volatile by-products formed in the reaction are dissolved in the liquid catalyst and removed from the process by withdrawing part of the liquid catalyst at a rate which will avoid excessive concentration of these reaction products.

The drawing is a diagrammatic illustration of apparatus suitable for carrying out the process, as will be discussed subsequently.

A large excess of acetylene should be used in the feed, as a much higher partial pressure of acetylene is desirable to compensate for the difference in solubility of acetylene and hydrogen cyanide in the liquid catalyst. Ratios of about 5 to 15 moles of acetylene per mole of hydrogen cyanide in the feed are suitable. Ratios higher than 15:1 involve excessive recycling without sufficient increase in production rate to justify the added expense. Ratios of less than 5:1 give markedly lower production rates and increase the proportion of undesired reaction products. Since acetylene and hydrogen cyanide combine in equimolar proportions to form acrylonitrile, the off-gas will contain about 4 to 14 moles of acetylene per mole of acrylonitrile formed and this excess is recycled. Reaction products are removed, and fresh acetylene and hydrogen cyanide added, at rates which will maintain substantially constant conditions in continuouso peration.

Substantially complete separation of reaction products from this large amount of recycled acetylene would be expensive. A highly important advantage of the process of this invention is that there is only a partial separation of reaction products from recycled constituents of the off-gas. It is quite surprising that the process will operate satisfactorily when substantial amounts of acrylonitrile and other reaction products, such as monovinylacetylene, are recycled to the liquid catalyst. This greatly simplifies product separation, as the crude acrylonitrile is adequately removed by condensation at much more economical condenser temperatures, particularly at pressures above atmospheric. The products can even be allowed to accumulate in the system to a concentration where separation of the crude acrylonitrile is accomplished with ordinary cooling water. Elimination of scrubbing makes it unnecessary to recover acrylonitrile from dilute solution in water or other solvent.

The solvent vaporized from the liquid catalyst has a higher boiling point than acrylonitrile and is removed from the off-gas in liquid form. It can be removed with the crude acrylonitrile and recovered subsequently for reuse, or it can be removed by a preliminary partial condensation or scrubbing prior tor emoval of crude acrylonitrile product as a separate step. In either case it is not necessary to effect a sharp separation of solvent from acrylonitrile or other reaction products. In fact, there is a definite advantage in recycling liquid acrylonitrile to the liquid catalyst. The recovered solvent can be recycled directly to the liquid catalyst or used to prepare make-up catalyst for addition during catalyst replacement.

Recycling of liquid acrylonitrile to the liquid catalyst is another important aspect of the invention. In the previous aqueous catalyst process the bulk of the heat of reaction has been removed by evaporation of water from the catalyst surface, taking with it its heat of volatilization of about 9000 calories per gram mole. The anhydrous process operates best with high boiling solvents, so that there is only a relatively small amount of solvent evaporation and little heat removal in this way. Higher productivity is obtained with non-aqueous liquid catalysts and hence more heat is produced in a given volume of catalyst in unit time. Sufficient heat can be removed by heat transfer through heat-exchange surfaces, but it will often be more economical to remove a significant part of this heat by evaporation of acrylonitrile. Furthermore, maintaining about 1% to 10% by weight of acrylonitrile in the liquid catalyst provides an automatic damping effect on temperature fluctuations, since any temperature increase results in increased volatilization of acrylonitrile which helps to hold the temperature down.

Acrylonitrile boils at 78°–79° C. at atmospheric pressure and has a heat of volatilization of 7800 calories per gram mole. If volatilization of acrylonitrile were the sole means used for removing heat of reaction, a recycle of about 4.5 moles of liquid acrylonitrile would be required for every mole of acrylonitrile produced. This is an undesirably high recycle rate. However, considerable heat is removed as sensible heat in the off-gas and a further reduction in the amount of heat can be achieved by introducing liquid instead of gaseous hydrogen cyanide into the feed, so it is entirely practicable to control the reaction temperature with recycled acrylonitrile.

Preferably the concentration of acrylonitrile in the reaction off-gas should not exceed 30% by volume; up to this value there is no more than a slight drop in catalyst productivity without other undesirable effect. If the concentration of acrylonitrile is increased above 30% by volume by recycling too much product with the acetylene and recovered solvent, or by feeding back crude acrylonitrile independently for cooling, or by reducing the ratio of acetylene to hydrogen cyanide in the feed, or by any combination of these conditions, then the catalyst productivity declines, although acrylonitrile concentrations up to 45 or 50% by volume in the off-gas are operable with a sacrifice in productivity.

The liquid catalyst is a complex mixture of copper compounds, organic reaction products and organic liquid. The copper compound added initially is cuprous chloride and, for the sake of simplicity, this will be regarded as the active form present in the liquid catalyst. If too much hydrogen cyanide is used in the feed the cuprous chloride is converted to an inactive form which may be cuprous cyanide or some complex thereof. If too little hydrogen cyanide is fed to the catalyst, excessive amounts of acetylene by-products form, e.g., monovinyl acetylene and materials formed from it. The copper catalyst is maintained in the most active form by feeding hydrogen cyanide at a rate which will leave a slight excess of unreacted hydrogen cyanide in the off-gas, and by introducing a small amount of hydrogen chloride. An excess of about 1% to 15% of hydrogen cyanide based on the feed rate is suitable, the preferred range being from 2% to 6% by weight of the feed. The rate at which hydrogen chloride is introduced will normally be about equal in weight to the excess of hydrogen cyanide, e.g., an amount about equal to 6% of the hydrogen cyanide feed is adequate when the weight of hydrogen cyanide in the off-gas is 6% of the feed. The catalyst is also maintained in an active form by catalyst replacement.

The liquid catalyst also contains a soluble mixture of non-volatile by-products of the reaction. Although this solidifies to a tar-like mass when separated from the liquid and cooled, liquid catalysts containing up to 30% by weight are adequately fluid at the reaction temperature. The dissolved tars can be permitted to accumulate in the liquid catalyst but it is preferable that they do not exceed an amount of about 20% by weight of the liquid catalyst. Larger amounts cause some decrease in catalyst activity. Excess tar is removed by withdrawing a portion of the liquid catalyst from the system and replacing it with a solution of cuprous chloride in organic liquid. This can be done continuously or at intervals.

The organic liquid used as a solvent for cuprous chloride should be relatively stable under the reaction conditions and boil well above the reaction temperature so as to minimize solvent replacement and recovery. The boiling point should be at least 100° C. The production rate obtainable with a given volume of liquid catalyst increases markedly with increased cuprous chloride concentration, so it will usually be desirable to use a good solvent in order to have a high concentration of cuprous chloride. A number of organic liquids which meet these simple requirements are known to the art. Although a variety of solvents can be used, a preferred class of solvents is the hydrocarbon nitriles and the corresponding fluorine, chlorine or bromine substituted hydrocarbon nitriles, of molecular weight 69 to 165. These may be augmented by the addition of minor amounts of another organic liquid, such as an acyclic or cyclic amide, which promote increased catalyst activity but are not essential. A particularly good liquid catalyst for use in the present invention is a solution containing about 35% to 40% of cuprous salts calculated as cuprous chloride, about the same amount of benzonitrile, 5% to 10% of a lower dialkylformamide and 1% to 10% of acrylonitrile, the remainder being tar and volatile by-products. The cuprous chloride content is stated on the basis of material added, although at least some of the copper undoubtedly forms other compounds in the solution.

The liquid catalyst can be maintained at any temperature between 70° C. and the boiling point of the liquid, but the preferred operating temperature is in the range of 90° to 140° C. and best results are usually obtained in the range of about 100° to 120° C. The maximum prduction rate obtainable with a given volume of liquid catalyst increases as the temperature is raised. However, the proportion of by-products increases even more rapidly above 120° C. and tar formation becomes an increasingly serious problem, particularly above 140° C.

Apparatus suitable for carrying out the above process is illustrated in the drawing. The liquid catalyst is contained within the reactor 10, comprising a vertical tubular body 12, to provide a separation zone where volatile reaction products can separate from the liquid catalyst, and a mixing vessel 14. The simple draft tube type of mixing vessel illustrated is adequate, but a plurality of draft tubes can be used and the draft tube or tubes can be located within the reactor body instead of externally as shown. Any conventional means for mixing gas and liquid can also be used. The bottoms of the reactor body and draft tube 14 are connected by U-shaped conduit 16 and the top of the draft tube is connected to the body at a point intermediate between the top and bottom by right-angle conduit 18. The liquid catalyst is introduced into the reactor through addition tube 20 and fills the reactor to about the top of right-angle conduit 18. The acetylene-hydrogen cyanide feed is introduced through inlet nozzle 22 into the lower part of the draft tube. A mixture of feed gas and liquid catalyst then passes up through the draft tube and into the reactor body. Excess feed, acrylonitrile and volatile by-products separate from the liquid catalyst and leave the reactor through off-gas conduit 24. The upper portion of the reactor extends above the level of the liquid catalyst for a sufficient distance to avoid excessive liquid entrainment. The liquid catalyst recycles from the bottom of the reactor body into the draft tube for further mixing with feed gas.

The draft tube is surrounded by jacket 26 through which heating or cooling fluid is circulated. At start up the draft tube is heated to bring the catalyst up to reaction temperature. The draft tube is then cooled to remove heat of reaction by circulating cooling water through the jacket. If the feed gas is stopped for any reason, the liquid catalyst can be kept from freezing until operation is resumed by using the jacket as a standby heater. The liquid catalyst can also be heated or cooled by other means, as by pumping liquid from the reactor through a heat exchanger and back to the reactor.

The off-gas passes from the reactor through conduit 24 to partial condenser 30, where the mixture is cooled sufficiently to condense organic liquid solvent evaporated from the liquid catalyst. This can be a conventional type of condenser using cooling water or other liquid to cool heat exchange surfaces, or it can be a direct contact condenser in which liquid is taken from the lower part of the condenser, cooled in an external heat exchanger, and reintroduced into the condenser in counter-current flow to the vapor. A sharper separation of the organic liquid from reaction products can be obtained by providing a stripper column 32 through which the condensate from the condenser passes in counter-current flow to the reactor off-gas. The condensed liquid is then fed back into the reactor, either directly through recycle liquid conduit 34 or through conduit 36 to catalyst make-up for use in dissolving cuprous chloride for subsequent addition to the reactor. The above partial condensation of off-gas to separate organic liquid solvent is greatly simplified by operating so that the condensate contains a substantial amount of acrylonitrile, and such recycled liquid acrylonitrile helps to remove heat from the reactor.

The remaining off-gas passes through conduit 38 to a product condenser 40, which is similar to partial condenser 30 but operates at a lower temperature to separate crude acrylonitrile product. The condensate contains acrylonitrile, together with small amounts of acetylene, hydrogen cyanide and volatile by-products, and is passed through conduit 42 to a conventional refining operation for recovery of pure acrylonitrile. This refining is simplified because the acrylonitrile is not dissolved in a solvent, although solvent scrubbing can be substituted for the product condenser if desired.

The condensed gas from the product condenser contains acetylene, any excess hydrogen cyanide, and a considerable amount of volatile reaction products. An important advantage of the process is that this gas is recycled to the reactor without removal of these reaction products. A typical recycled gas may contain, in addition to acetylene and a small amount of hydrogen cyanide, 5 to 20 mol percent vinyl chloride, 2% or more of acrylonitrile and appreciable amounts of monovinylacetylene. Separation of the crude acrylonitrile product is made much easier by leaving a portion in the gas. This uncondensed off-gas is returned by blower 44 to the reactor feed inlet nozzle through gas recycle conduit 46. Fresh feed of acetylene and hydrogen cyanide, in substantially equimolar proportions, is introduced into the recycle stream through feed conduit 48. The fresh acetylene and hydrogen cyanide could be introduced, either separately or as a mixture, at any point in the system which would ultimately bring it into contact with the liquid catalyst in the reactor, but the arrangement shown has the advantage of providing active circulation of the catalyst through the reactor, thus assuming intimate contact with the reactant gases and facilitating heat transfer between the draft tube and its surrounding jacket.

The non-volatile by-products formed in the reactor are removed by purging liquid catalyst through valve 50, located at the bottom of the reactor, and adding cuprous chloride and organic liquid solvent through make-up tube 20 to maintain the desired composition of liquid catalyst. Excessive cyanide content in the catalyst is avoided by introducing hydrogen chloride either with the feed or separately into the liquid catalyst. Liquid acrylonitrile for controlling the catalyst temperature can be supplied solely in the recycle from partial condenser 30, or a proportion of the crude acrylonitrile from product condenser 40 can be returned to the reactor as required to maintain constant temperature.

The system is normally operated at substantially atmospheric pressure, or up to about 15 pounds per square inch gage pressure, but this is not a limitation. Furthermore, the off-gas pressure can be raised so that condensation of acrylonitrile or solvent occurs at a higher temperature; for example, the blower 44 can be placed in conduit 38 instead of conduit 46 to increase the permissive temperature of the coolant supplied to condenser 40. Operation with the system at 15 to 60 p.s.i.g. is quite satisfactory if suitable safety precautions are taken in processing gas having such a high concentration of acetylene.

The following examples, in which parts or percentages are by weight unless otherwise indicated, illustrate specific embodiments of the invention:

*Example 1*

The reactor containing substantially anhydrous liquid catalyst was fed with a gas mixture containing acetylene and hydrogen cyanide in a mol ratio of 12:1. Fresh hydrogen cyanide was introduced at a rate which maintained an excess of about 5% (based on the amount introduced) in the reactor off-gas, and acetylene was introduced at the required rate to maintain the above proportion of 12 mols acetylene to 1 mol of hydrogen cyanide in the feed gas. Hydrogen chloride was also introduced into the feed gas in the ratio of 1 mol of hydrogen chloride to 17 mols of hydrogen cyanide. Liquid acrylonitrile was fed to the reactor, to help remove the heat of reaction, at the rate of 1 pound in the feed for each 1 pound of acrylonitrile produced from the acetylene and hydrogen cyanide. This liquid acrylonitrile was recycled from the condenser recovery system for separating crude acrylonitrile and catalyst solvent from the reactor off-gas.

The liquid catalyst was maintained at 115° C. by cooling with the recycled acrylonitrile and with additional cooling by heat transfer. The non-volatile by-products or tars produced in the reaction were removed from the reactor by withdrawing liquid catalyst and adding make-up at a rate amounting to 24 pounds of catalyst replacement per 100 pounds of acrylonitrile produced to maintain the tar concentration in the liquid catalyst at about 15 to 16%. Catalyst make-up was added so as to keep the liquid catalyst at constant volume and fairly uniform composition. Samples, taken at the point where the liquid catalyst was recycled from the separation zone of the reactor to the draft tube mixing vessel of the reactor, analyzed 29.9–32.0% cuprous chloride, 6.5–8.3% cuprous cyanide, 34.5–35.9% benzonitrile, 7.0–10.0% dimethylformamide, 1.6–2.2% acrylonitrile and 14.5–17.4% tars at various times during the run.

Under these conditions a space-time yield of 83.5–89.4 pounds of acrylonitrile per cubic foot of liquid catalyst per day was achieved at a yield of 94% based on hydrogen cyanide used and 90% based on the acetylene. The average amount of by-product formation per 100 pounds of acrylonitrile product was 4.4 lbs. tar, 3.2 lbs. vinyl chloride, 0.7 lb. monovinylacetylene, 0.3 lb. chloroprene, 0.1 lb. cyanobutadiene, and 0.05 lb. divinylacetylene and its isomer. The crude acrylonitrile was refined by fractional distillation.

*Example 2*

A reactor was charged with anhydrous liquid acrylonitrile catalyst which initially contained 5% dimethylformamide, 10% acrylonitrile, 48% benzonitrile and 37% cuprous chloride. The catalyst and the gas space above it were maintained at 100° C. The reactor feed, in parts per hour per 1000 parts of liquid catalyst, was approximately 15 parts liquid hydrogen cyanide, 51 parts liquid acrylonitrile, 115 parts acetylene and 1.2 parts anhydrous hydrogen chloride. The proportions in the feed were adjusted as necessary to maintain a molar ratio of 1 hydrogen cyanide:1.8 acrylonitrile:8 acetylene:0.06 hydrogen chloride, and the total flow was regulated so that 2.5–5.0% of the hydrogen cyanide entering the reactor emerged unreacted.

After correct adjustment of the feed rates was accomplished the space-time yield averaged 60 pounds of acrylonitrile/cu. ft. of catalyst/day for 200 hours without replacement of cuprous chloride catalyst. The tar was allowed to accumulate in the reactor, reaching a content of about 15% in the liquid catalyst. The concentration of acrylonitrile in the recycled catalyst, just prior to mixing with reactor feed, was about 6% and the reactor off-gas contained about 29% acrylonitrile during this time. The yield of acrylonitrile was about 95% based on the hydrogen cyanide used. In comparison with the previous example, the lower temperature resulted in about one-half the rate of tar formation and the greater recycle of acrylonitrile, by increasing the concentration in the liquid catalyst and off-gas, simplified the problems of temperature control and of recovery of acrylonitrile from the off-gas. These advantages offset the somewhat lower space-time yield.

*Example 3*

Example 2 was repeated but using a reactor feed of 1 mol hydrogen cyanide:2.3 acrylonitrile:5 acetylene:0.06 hydrogen chloride. This substantial increase in the proportion of acrylonitrile and decrease in the proportion of acetylene resulted in a reactor off-gas containing 45% acrylonitrile and an average space-time yield of about 40 pounds of acrylonitrile/cu. ft. of catalyst/day. The performance was otherwise similar to that of Example 2. About 30% of the acrylonitrile in the reactor off-gas was removed as product and refined by fractional distillation. The high rate of acrylonitrile recycle used in this example resulted in a considerably lower space-time yield than was obtained in the previous examples, which may be undesirable.

*Example 4*

The reactor was operated with a liquid catalyst which had been used for a prolonged period and contained approximately 10% dimethylformamide, 26% benzonitrile, 30% cuprous chloride, 5% cuprous cyanide and 29% by-product tars. The reactor off-gas was cooled in a single contact condenser to give recycle gas which still contained a substantial amount of acrylonitrile. Fresh acetylene, hydrogen cyanide and hydrogen chloride were added to the recycle gas to provide a composition of approximately 83.7% acetylene, 5.5% hydrogen cyanide, 0.3% hydrogen chloride, 7% vinyl chloride and 3.5% acrylonitrile in the feed gas to the reactor. The liquid condensate from the contact condenser contained 80–85% acrylonitrile, the remainder being largely benzonitrile and dimethylformamide, but also including small amounts of by-products, for example, vinyl chloride, mono- and divinylacetylene and cyanobutadiene. This crude acrylonitrile was divided into two streams, one being recycled to the reactor and the other being removed from the system as crude product. The proportion of liquid recycled was such that 1 pound of acrylonitrile (pure basis) was recycled for each 1 pound of acrylonitrile produced from acetylene and hydrogen cyanide. The composition of the liquid catalyst was maintained substantially constant by catalyst replacement with make-up, and the temperature was maintained at 100° C. Due to the large amount of by-product tars and low cuprous chloride content of the liquid catalyst in comparison with Example 2, the space-time yield was about 20% lower but the results were comparable in other respects. A more favorable liquid catalyst composition is usually desirable in order to obtain higher productivity.

*Example 5*

A reactor was operated at 100° C. with a feed gas having a 4% acrylonitrile content and an acetylene to hydrogen cyanide to hydrogen chloride molar ratio of 8:1:0.06. The liquid catalyst analyzed about 31.5% cuprous chloride, 6% cuprous cyanide, 5% dimethylformamide, 54.5–47.5% benzonitrile and 3–10% by-product tar during the 100 hour run. The tar formed was allowed to accumulate in the liquid catalyst and the benzonitrile content was correspondingly decreased, by adding liquid benzonitrile at a slower rate than it was removed in the off-gas, in order to maintain a constant catalyst volume. There was no recycle of liquid acrylonitrile. The acrylonitrile content of the reactor off-gas was about 15% by volume. Recovery of crude product from off-gas containing 15% by volume acrylonitrile was readily accomplished, particularly since recycled off-gas could contain 4% by volume of acrylonitrile. Under these conditions a space-time yield of about 70 pounds acrylonitrile/cu. ft. of catalyst/day was obtained at a yield of about 95% based on the hydrogen cyanide consumed.

*Example 6*

The reactor was operated at 110° C. with a liquid catalyst maintained, by partial replacement of catalyst, at an approximate composition of 23% cuprous chloride, 10% cuprous cyanide, 12% dimethylformamide, 29% benzonitrile and 26% tars. The reactor off-gas was compressed to 14 pounds per square inch gage pressure before separating crude acrylonitrile at 7° C. in the condenser system. The residual off-gas was then recycled at lower pressure to the reactor. Make-up acetylene and hydrogen cyanide were added to the recycled gas to make a reactor feed gas containing 2.2 mol percent acrylonitrile, 5.3 mol percent hydrogen cyanide, 0.7 mol percent monovinylacetylene, 9.3% mol percent vinyl chloride and 82.5 mol percent acetylene. Hydrogen chloride was also introduced into the catalyst at the rate of 0.06 mol/mol of hydrogen cyanide. The feed rate was such that the off-gas composition was 7.0 mol percent acrylonitrile, 0.5 mol percent hydrogen cyanide, 0.8 mol percent monovinylacetylene, 10.3 mol percent vinyl chloride and 81.4 mol percent acetylene. The production and yield of acrylonitrile obtained under these conditions were similar to those of Example 4 and the same observation regarding the liquid catalyst composition applies.

Since many different embodiments of the invention may be made without departing from the spirit and scope thereof, it is to be understood that the invention is not limited by the specific illustrations except to the extent defined in the following claims.

We claim:

1. The process for preparing acrylonitrile which comprises feeding hydrogen cyanide and at least 5 moles of acetylene per 1 mole of hydrogen cyanide into a substantially anhydrous cuprous chloride liquid catalyst, the cuprous chloride being dissolved in an organic nitrile solvent having a boiling point at atmospheric pressure above 100° C., maintaining the liquid catalyst at a temperature above 70° C. and below the boiling point of the organic nitrile solvent, conducting away from the liquid catalyst an off-gas containing acrylonitrile, volatile by-products, unreacted acetylene and any of the organic nitrile solvent vaporized from the liquid catalyst, separating at least 30% of the acrylonitrile and part of the by-products from the off-gas as a crude acrylonitrile product, and recycling the unreacted acetylene, part of the volatile by-products and at least 10% of the acrylonitrile initially contained in the off-gas to the liquid catalyst.

2. A process as defined in claim 1 wherein the hydrogen cyanide is fed to the liquid catalyst at a rate which provides an excess of 1% to 15% of unreacted hydrogen cyanide in the off-gas, based on the feed rate, the acetylene is fed at a rate of 5 to 15 moles of acetylene per 1 mole of hydrogen cyanide, and a small amount of hydrogen chloride of up to 15% by weight of the hydrogen cyanide feed is introduced to maintain the catalyst in an active form.

3. A process as defined in claim 1 wherein the liquid catalyst contains from 5% to 20% by weight of non-volatile by-product tar reaction products and excess tar is removed by replacing liquid catalyst with cuprous chloride dissolved in said organic nitrile solvent.

4. A processas defined in claim 1 wherein the organic nitrile solvent comprises a hydrocarbon nitrile of molecular weight 69 to 165 as a major constituent.

5. A process as defined in claim 1 wherein organic nitrile solvent and part of the acrylonitrile are condensed from the off-gas and recycled to the liquid catalyst prior to the separation of crude acrylonitrile product from the off-gas.

6. A process as defined in claim 1 wherein sufficient liquid acrylonitrile is recycled to the liquid catalyst to maintain a concentration of 1% to 10% by weight in the liquid catalyst and up to 40% by volume in the off-gas.

7. In the continuous process for preparing acrylonitrile by mixing a feed containing acetylene and hydrogen cyanide in a ratio of about 5 to 15 moles of acetylene per 1 mole of hydrogen cyanide with a substantially anhydrous liquid catalyst containing cuprous chloride dissolved in organic liquid solvent, the catalyst being maintained at a temperature above 70° C.and below the boiling point of the organic liquid solvent, separating from the liquid catalyst an off-gas containing volatile reaction products, unreacted feed, and any of the organic liquid solvent vaporized from the liquid catalyst, and recovering the acrylonitrile product from the off-gas, the improvement of mixing the feed with the liquid catalyst, conducting the resulting mixture to a separation zone, separating the off-gas from the liquid catalyst, recovering as product only part of the acrylonitrile contained in the off-gas and recycling 10% to 70% of the acrylonitrile initially contained in the off-gas to the liquid catalyst, recycling liquid catalyst containing from 1% to 10% by weight of acrylonitrile in solution and mixing the liquid catalyst with additional feed.

References Cited in the file of this patent

UNITED STATES PATENTS

| | | |
|---|---|---|
| 2,332,527 | Pyzel | Oct. 26, 1943 |
| 2,475,822 | Cummings | July 12, 1949 |
| 2,621,204 | MacLean et al. | Dec. 9, 1952 |
| 2,684,978 | Stehman | July 27, 1954 |
| 2,697,030 | Haufe et al. | Dec. 14, 1954 |